United States Patent Office 3,123,823
Patented Mar. 3, 1964

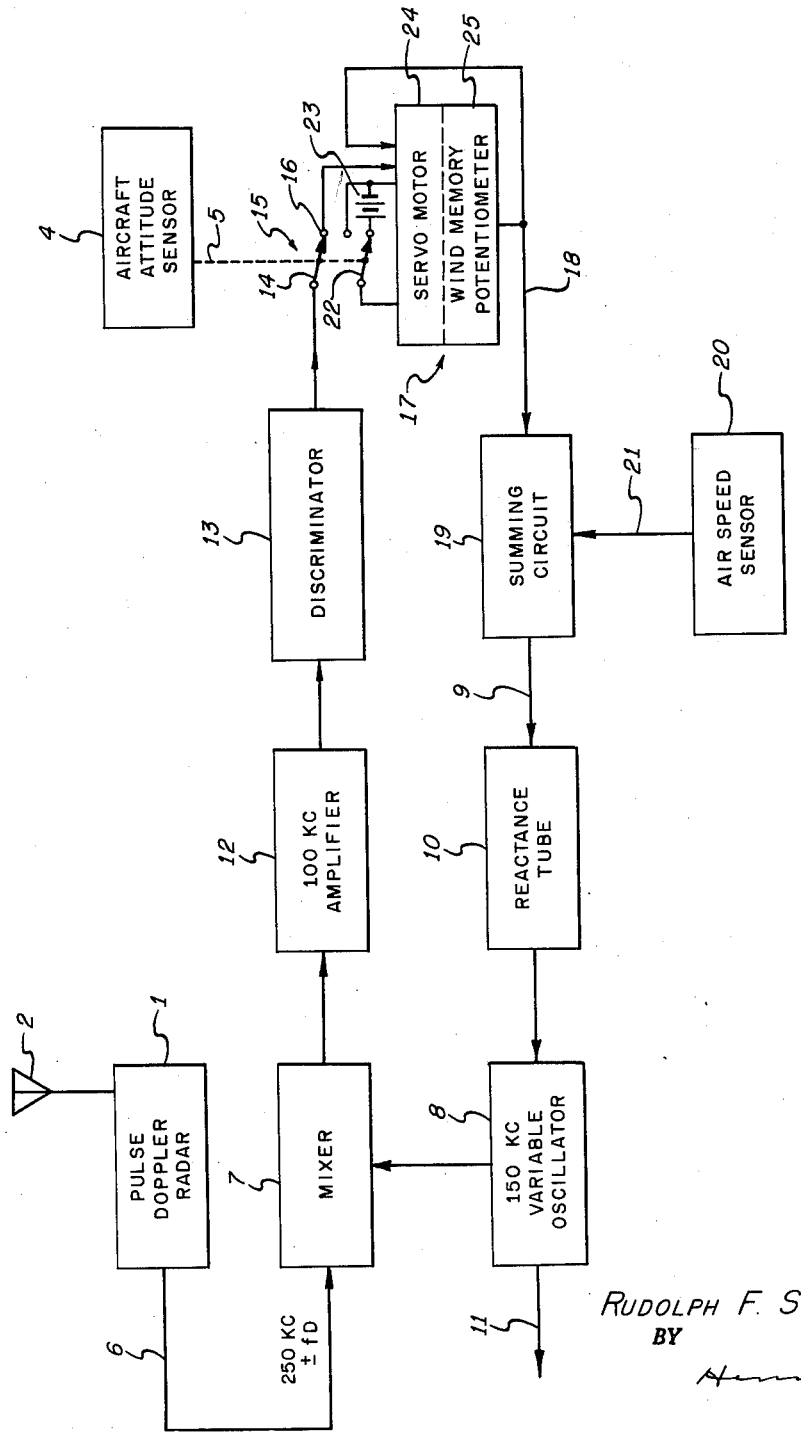

3,123,823
DOPPLER RADAR SIGNAL TRACKER
Rudolph F. Schreitmueller, New Hyde Park, N.Y., assignor to Sperry Rand Corporation, Great Neck, N.Y., a corporation of Delaware
Filed Sept. 23, 1960, Ser. No. 58,111
8 Claims. (Cl. 343—8)

The present invention generally relates to automatic signal frequency tracking systems and, more particularly, to a doppler signal tracker for use in a doppler radar.

As is well known, the frequency of a signal reflected by an irradiated radar target is a function of the difference between the velocities of the radar and the target as measured along the line of sight between said radar and target. The frequency deviation of the reflected target signal from the transmitted radar carried frequency is popularly termed "doppler frequency." The value of the doppler frequency is a function of the relative velocity between the radar and the target whereas the sense of the doppler frequency deviation from the aforesaid carrier frequency is a measure of the direction that the target is moving relative to the radar, i.e., whether the range of the target is increasing or decreasing.

The doppler signal received by an airborne doppler radar receiver from the ground covers a spectrum of frequency values including noise signal components. Consequently, the raw, noisy pulsed doppler signal must first be operated upon to produce a single "clean," relatively noise-free signal having a value corresponding to the center frequency of the received doppler signal power spectrum before precise target velocity data can be extracted. This is the function of the so-called doppler signal tracker.

A doppler signal tracker basically comprises a signal mixer, a frequency discriminator and a frequency tracking oscillator. The tracking oscillator signal is mixed with the received pulsed doppler signal and the resulting sideband signal is applied to the frequency discriminator which has a predetermined center frequency. The filtered signal output of the discriminator is an essentially direct current potential having an amplitude representing the frequency deviation of the received doppler signal from the predetermined center frequency and having a polarity representing the sense of said deviation. The signal output, in turn, is applied as a frequency control potential to the tracking oscillator whereby the oscillator is urged to operate at a frequency near the center frequency of the doppler signal power spectrum. The noise-free oscillator output signal is then used to determine the target velocity.

It can be shown that a conventional doppler signal tracking system such as described above is subject to error from two sources. One source is inherent in the tracking system itself and produces an error which is a function of the gain of the tracking system servo loop. A second source of error arises in certain applications such as where the doppler radar is airborne and the antenna is not precisely stabilized against the pitch and roll of the aircraft. Among other factors, the attitude of the aircraft carrying the doppler radar influences the frequency of the target doppler signal.

It is the principal object of the present invention to provide an improved doppler signal tracking system for measuring target velocity with enhanced precision.

Another object is to provide a doppler signal tracker for use in an airborne pulse doppler radar system which is not stabilized against aircraft pitch and roll.

An additional object is to provide a doppler signal tracker for producing a useful output signal representing target velocity despite momentary loss of the received doppler target signal.

These and other objects of the present invention, as will become apparent from a reading of the following specification, are achieved in a preferred embodiment by the provision of an airborne pulse doppler radar system having a doppler signal tracker for the production of an output signal at a frequency proportional to the velocity of the target relative to the velocity of the radar. The signal tracker comprises a variable frequency tracking oscillator and a mixer for heterodyning the oscillator output signal with the received target doppler signal. The resulting sideband signal at the output of the signal mixer is applied to a frequency discriminator. The output signal from the discriminator, representing the frequency deviation of the target doppler signal from a predetermined value (hence representing target relative velocity), is selectively applied to a signal storage device of an electrical servo type. The output signal of the storage device is additively combined with another signal representing the airspeed of the aircraft carrying the radar. The sum of the signals is then applied to a reactance tube for controlling the frequency of the variable frequency oscillator.

Means are also provided for monitoring any movement of the pulse doppler radar antenna attributable to the pitch and roll of the carrier aircraft. When said pitch and roll is below predetermined tolerable limits, the output of the frequency discriminator is coupled to the input of the signal storage device. Whenever the pitch and roll exceeds said predetermined limits and for the duration of such error producing variations in aircraft attitude, the connection between the frequency discriminator and the signal storage device is interrupted. The velocity of the target relative to the radar is determined in accordance with conventional techniques by measuring the frequency of the output signal produced by the variable frequency oscillator.

For a more complete understanding of the present invention, reference should be had to the following specification and to the sole figure which is a simplified block diagram of a preferred embodiment of the doppler signal tracker constructed in accordance with the invention.

The reference numeral 1 generally designates a conventional pulse doppler radar mounted on an aircraft. Recurrent pulses of electromagnetic energy are radiated by antenna array 2 toward target objects comprising the terrain traversed by the aircraft. Antenna array 2 is rigidly fixed to the aircraft with no provisions being made for stabilization against aircraft pitch and roll. Aircraft attitude sensor 4 senses the pitch and roll movement of the aircraft. Gyroscopic sensing elements are well known in the art for intrumenting sensor 4 and for producing a control signal when the monitored pitch and roll of the aircraft exceed predetermined limiting values. The control signal actuates mechanical linkage 5.

Ground targets video signals are produced by radar 1 and applied via line 6 to mixer 7. It is presumed that radar 1 includes means for processing the ground target signals received by antenna array 2 so as to produce video signals on line 6 having a frequency representing the heading angle component of the velocity of the terrain relative to the velocity of the aircraft, i.e., representing aircraft ground speed as measured along the heading angle. A suitable radar for producing such video signals is described in U.S. Patent No. 2,849,184 to A. H. Fredrick et al., issued on August 26, 1958. For convenience in the following description, the nominal frequency of the ground speed video signals of line 6 is designated as having the illustrative value of 250 kc. In the presence of ground targets (which are moving relative to the air craft), the actual frequency of the video signals will deviate from the nominal frequency of 250 kc. Thus, the video signal input to mixer 7 is designated 250 kc.$\pm f_D$ where $f_D$ represents the doppler frequency shift representing aircraft ground speed.

The output signal produced by variable oscillator 8 is applied to a second input terminal of mixer 7. In the illustrative case, oscillator 8 is designated as operating at a nominal frequency of 150 kc. The actual operating frequency of oscillator 8 is determined by a frequency control potential appearing on line 9 and applied to reactance tube 10. A single frequency signal corresponding to the center frequency of the received doppler signal power spectrum is produced at the output of oscillator 8 on line 11 for further processing in a known manner to determine aircraft ground speed.

The lower sideband signal produced at the output of mixer 7 is applied via amplifier 12 to frequency discriminator 13. Said sideband signal would be at the nominal frequency of 100 kc. in the case of "fixed" targets (targets which are not moving radially relative to the aircraft carrying doppler radar 1). The center frequency of discriminator 13 is adjusted to the nominal frequency of 100 kc. An essentially direct current potential is produced at the output of discriminator 13 and applied to arm 14 of switch 15. The amplitude of the signal applied to arm 14 represents the extent of the frequency deviation of the signal at the output of amplifier 12 from the discriminator center frequency and hence the ground speed of the aircraft. In the deactuated position shown where arm 14 contacts terminal 16 of switch 15, the output signal produced by discriminator 13 is directly applied to the input of wind memory servo 17. The deactuated position is assumed upon the condition that the position of antenna array 2 is within the predetermined tolerable pitch and roll limits established in sensor 4.

Wind memory servo 17 is of a conventional follow-up type comprising servomotor 24 and feedback potentiometer 25. As will be apparent to those skilled in the art, servo 17 automatically operates to reproduce on line 18 a signal having the same amplitude and polarity as the input signal applied via arm 14 of switch 15. Two functions are performed by servo 17. One function is to act as a low-pass filter to smooth and couple the output of discriminator 13 to the input of circuit 19. The other function is to provide signal storage when ganged arms 14 and 22 of switch 15 are actuated by the upward movement of linkage 5. The actuation of arm 14 breaks the connection between the output of discriminator 13 and the input to servomotor 24. The simultaneous actuation of arm 22 disconnects the field supply 23 from servomotor 24 thereby stalling the servomotor and maintaining the output signal of line 18 which immediately preceded the upward movement of linkage 5.

The signal produced on line 18 is applied to a first input terminal of summing circuit 19. Airspeed sensor 20 generates a signal on line 21 representing the airspeed of the aircraft as measured along the heading angle. The signal of line 21 is applied to the second input terminal of summing circuit 19 wherein it is algebraically combined with the signal of line 18. It will be seen that the signals appearing on lines 6, 18 and 21 respectively represent actual aircraft ground speed, wind speed and aircraft airspeed. The output signal of line 11 represents computed aircraft ground speed.

It will now be shown that the computed output signal of line 11 more accurately represents actual aircraft ground speed than would be the case in the event that the airspeed data signal of line 21 were not used continuously. Said airspeed data is not used continuously in the doppler signal tracking devices of the prior art. A typical prior art arrangement may be readily visualized with the aid of the sole figure by assuming that the output of discriminator 13 is permanently connected to the input of servo 17 and that line 18 is coupled to line 9 (circuit 19 being omitted). Only the basic elements of mixer 7, discriminator 13, the filter equivalent of servo 17, reactance tube 10 and tracking oscillator 8 would then be utilized.

For the purpose of analyzing the operation of the prior art signal tracker, it is assumed that the mixer, reactance tube and variable oscillator each have a "gain" or scale factor of unity. By way of definition, factor K represents the gain of discriminator 13 whereas the factor G represents the gain of the filter equivalent of servo 17. Let $x$ represent the signal appearing on line 6 and $u$ represent the output signal of oscillator 8. Thus, $u=KG(x-u)$. Rearranged, (1) $$u=\frac{KG}{1+KG}x$$

If the product KG is sufficiently large, then $u$ is very nearly equal to $x$ meaning that the computed ground speed very nearly equals the actual ground speed.

A similar analysis may be made of the total circuit shown in the sole figure by letting the factor $y$ represent the aircraft airspeed signal input of line 21. Thus, $u=KG(x-u)+y$. Rearranged, (2) $$u=\frac{KG}{1+KG}x+\frac{1}{1+KG}y$$

It should be noted that the factor $y$ (representing aircraft airspeed) may be expressed in terms of the signal $x$ appearing on line 6 and the signal $z$ appearing on line 18.

That is, (3) $$y=x-z$$

Combining Expressions 2 and 3 and rearranging, there results, (4) $$|u-x|=\frac{z}{1+KG}$$

Expression 4 states that the difference between the actual ground speed $x$ and the computed ground speed $u$ is proportional to the quotient $$\frac{z}{1+KG}$$

Expression 1 may be restated as (5) $$|x-u|=\frac{x}{1+KG}$$

By comparing Expressions 4 and 5 and noting that the value of aircraft ground speed $x$ is larger than the value of wind speed $z$, it can be seen that the computed ground speed $u$ more closely approaches the actual ground speed $x$ in Expression 4 than it does in Expression 5. It will be recalled that Expression 4 refers to the structure of the present invention whereas Expression 5 refers to the prior art signal tracker which omits the aircraft airspeed data of line 21.

Not only is the accuracy of the ground speed signal output of line 11 enhanced by the use of aircraft airspeed data but an additional and useful "memory" mode of operation is readily available. The memory mode is initiated by the actuation of linkage 5. In the illustrative case, such actuation would result from the movement of antenna 2 beyond the predetermined tolerable pitch and roll limits whereupon sensor 4 would move linkage 5 upwardly in the view of the drawing to break the connection between discriminator 13 and servo 17. As previously discussed, provision is made to maintain the output signal of line 18 as it was immediately preceding the actuation of linkage 5. Thus, wind speed data is stored when a condition arises in which the ground speed doppler signal of line 6 may not be relied upon. The stored wind speed signal of line 18 is combined with the continuously generated aircraft airspeed signal of line 21 to maintain frequency control over oscillator 8 and thereby to maintain generation of the computed aircraft ground speed signal at line 11. Ordinarily, the interval is relatively brief during which the pitch and roll of the aircraft is beyond the predetermined tolerable limits. Therefore, the continuously computed aircraft ground speed signal of line 11 may be utilized to advantage for the uninterrupted computation of aircraft ground speed.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. An automatic signal frequency tracking system comprising a source of first alternating signals, a variable frequency source of second alternating signals, a signal mixer, said first and second signals being applied to said mixer, a signal frequency discriminator connected to the output of said mixer, low-pass filtering means connected to the output of said discriminator, a signal summing circuit having two inputs, one of said inputs being connected to the output of said filtering means, a source of third signal having a value related to the frequency of said first signals, said third signal being applied to the other of said inputs of said summing circuit, and means for connecting the output of said summing circuit to said variable frequency source, the output signal of said summing circuit determining the frequency of said second signals produced by said variable frequency source.

2. An automatic signal frequency tracking system comprising a source of first alternating signals, a variable frequency source of second alternating signals, a signal mixer, said first and second signals being applied to said mixer, a signal frequency discriminator connected to the output of said mixer, servo means connected to the output of said discriminator, said servo means producing an output signal substantially identical to the signal at the output of said discriminator, a signal summing circuit having two inputs, one of said inputs being connected to the output of said servo means, a source of direct potential signal having an amplitude related to the frequency of said first signals, said direct potential signal being applied to the other of said inputs of said summing circuit, and reactance tube means for connecting the output of said summing circuit to said variable frequency source, the output signal of said summing circuit determining the frequency of said second signal produced by said variable frequency source.

3. An automatic signal frequency tracking system comprising a source of first alternating signals, a variable frequency source of second alternating signals, a signal mixer, said first and second signals being applied to said mixer, a signal frequency descriminator connected to the output of said mixer, actuable servo means of the follow-up type connected to the output of said discriminator, said servo means when actuated producing an output signal substantially identical to the input signal applied thereto and maintaining when deactuated said output signal last obtaining prior to deactuation, a signal summing circuit having two inputs, one of said inputs being connected to the output of said servo means, a source of third signals having a value related to the frequency of said first signals, said third signal being applied to the other of said inputs of said summing circuit, and means for connecting the output of said summing circuit to said variable frequency source, the output signal of said summing circuit determining the frequency of said second signals produced by said variable frequency source.

4. A doppler signal tracker for use in an airborne doppler radar, said radar producing first signals having a frequency component representing the ground speed of the aircraft carrying said radar, a variable frequency source of second signals, a signal mixer, said first and second signals being applied to said mixer, a signal frequency discriminator connected to the output of said mixer, low pass filtering means connected to the output of said discriminator, a signal summing circuit having two inputs, one of said inputs being connected to the output of said filtering means, a source of third signal having a value representing the airspeed of said aircraft, said third signals being applied to the other of said inputs of said summing circuit, and means for connecting the output of said summing circuit to said variable frequency source, the output signal of said summing circuit determining the frequency of said second signals produced by said variable frequency source.

5. A doppler signal tracker for use in an airborne doppler radar, said radar producing first signals having a frequency component representing the ground speed of the aircraft carrying said radar, a variable frequency source of second signals, a signal mixer, said first and second signals being applied to said mixer, a signal frequency discriminator connected to the output of said mixer, servo means connected to the output of said discriminator, said servo means producing an output signal substantially identical to the output signal of said discriminator, a signal summing circuit having two inputs, one of said inputs being connected to the output of said servo means, a source of direct potential signal having an amplitude representing the airspeed of said aircraft, said direct potential signal being applied to the other of said inputs of said summing circuit, and reactance tube means for connecting the output of said summing circuit to said variable frequency source, the output signal of said summing circuit determining the frequency of said second signals produced by said variable frequency source.

6. A doppler signal tracker for the use in an airborne doppler radar, said radar producing first signals having a frequency component representing the ground speed of the aircraft carrying said radar, a variable frequency source of second signals, a signal mixer, said first and second signals being applied to said mixer, a signal frequency discriminator connected to the output of said mixer, actuable servo means of the follow-up type coupled to the output of said discriminator, said servo means producing when actuated an output signal substantially identical to the input signal applied thereto and maintaining when deactuated the output signal last obtaining prior to deactuation, means for sensing the attitude of said aircraft, said means for sensing producing a deactuating signal when the attitude of said aircraft is outside predetermined attitude limits, said deactuating signal being applied to said servo means for deactuating said servo means, a signal summing circuit having two inputs, one of said inputs being connected to the output of said servo means, a source of third signal having a value representing the airspeed of said aircraft, said third signal being applied to the other of said inputs of said summing circuit, and means for connecting the output of said summing circuit to said variable frequency source, the output signal of summing circuit determining the frequency of said second signal produced by said variable frequency source.

7. A doppler signal tracker for use in an airborne doppler radar, said radar producing first signals having a frequency component representing the ground speed of the aircraft carrying said radar, a variable frequency source of second signals, a signal mixer, said first and second signals being applied to said mixer, a signal frequency discriminator connected to the output of said mixer, actuable servo means of the follow-up type coupled to the output of said discriminator, said servo means producing when actuated an output signal substantially identical to the input signal applied thereto and maintaining when deactuated the output signal last obtaining prior to deactuation, means for sensing the attitude of said aircraft, said means for sensing producing a deactuating signal when the attitude of said aircraft is outside predetermined attitude limits, said deactuating signal being applied to said servo means for deactuating said servo means, a signal summing circuit having two inputs, one of said inputs being connected to the output of said servo means, a source of direct potential signal having an amplitude representing the airspeed of said aircraft, said direct potential signal being applied to the other of said inputs of said summing circuit, and reactance tube means for connecting the output of said summing circuit to said variable frequency source, the output signal of said summing circuit determining the frequency of said second signals produced by said variable frequency source.

8. A doppler signal tracker for use in an airborne doppler radar, said radar producing first signals having a frequency component representing the ground speed of the aircraft carrying said radar, a variable frequency source of second signals, a signal mixer, said first and second signals being applied to said mixer, a signal frequency discriminator connected to the output of said mixer, actuable servo means of the follow-up type coupled to the output of said discriminator, said servo means producing when actuated an output signal substantially identical to the input signal applied thereto and maintaining when deactuated the output signal last obtaining prior to deactuation, means for sensing the pitch and roll of said aircraft, said means for sensing producing a deactuating signal when the pitch and roll of said aircraft is greater than predetermined amounts, said deactuating signal being applied to said servo means for deactuating said servo means, a signal summing circuit having two inputs, one of said inputs being connected to the output of said servo means, a source of third signal having a value representing the airspeed of said aircraft, said third signal being applied to the other of said inputs of said summing circuit, and means for connecting the output of said summing circuit to said variable frequency source, the output signal of said summing circuit determining the frequency of said second signal produced by said variable frequency source.

No references cited.